United States Patent
Sharma et al.

(10) Patent No.: US 11,956,144 B1
(45) Date of Patent: Apr. 9, 2024

(54) SYSTEMS AND METHODS FOR NETWORK TRAFFIC ROUTING AND LOAD BALANCING IN AN ELECTRONIC NETWORK

(71) Applicant: BANK OF AMERICA CORPORATION, Charlotte, NC (US)

(72) Inventors: Kamal D Sharma, Mason, OH (US); Kevin A. Delson, Woodland Hills, CA (US); Gilbert Gatchalian, Union, NJ (US); Satya Veerabhadra Rao Iruku, Chesterfield, NJ (US); Noell York Eury, Charlotte, NC (US); Dhananjay Bhat, North Chelmsford, MA (US); Russ Ferguson, Brooklyn, NY (US); Matthew Eisenhauer, New York, NY (US); Larry A. Davis, Jr., The Colony, TX (US); Aaron Gee, Palm Coast, FL (US); Kurt Clarence Blust, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/234,221

(22) Filed: Aug. 15, 2023

(51) Int. Cl.
*H04L 45/28* (2022.01)
*H04L 45/302* (2022.01)
*H04L 47/125* (2022.01)

(52) U.S. Cl.
CPC .......... *H04L 45/28* (2013.01); *H04L 45/3065* (2013.01); *H04L 47/125* (2013.01)

(58) Field of Classification Search
None
See application file for complete search history.

(56) References Cited

U.S. PATENT DOCUMENTS

| | | | |
|---|---|---|---|
| 5,115,433 A | 5/1992 | Baran | |
| 5,774,660 A | 6/1998 | Brendel | |
| 6,658,481 B1 | 12/2003 | Basso | |
| 7,522,603 B2 | 4/2009 | Vasseur | |
| 7,574,499 B1 | 8/2009 | Swildens | |

(Continued)

FOREIGN PATENT DOCUMENTS

| | | |
|---|---|---|
| CA | 2496205 C | 9/2009 |
| EP | 1619833 A1 | 1/2006 |

*Primary Examiner* — Angela Nguyen
(74) *Attorney, Agent, or Firm* — Moore & Van Allen PLLC; Lauren M. Stokes

(57) ABSTRACT

Systems, computer program products, and methods are described herein for network traffic routing and load balancing in an electronic network. The present disclosure is configured to identify, by an application layer, at least one website access request by a user account, wherein a website access request comprises a website identifier; transmit the website access request to a traffic routing layer; identify, by the traffic routing layer, a plurality of potential websites; determine, by the traffic routing layer, whether a routing identifier is present for the user account and in response to determining the routing identifier, pin the user account to a pinned website of the potential websites based on the routing identifier; and determine, by the traffic routing layer, whether the pinned website comprises an up attribute or down attribute, and to direct the website access request based on at least this up or down attribute.

20 Claims, 10 Drawing Sheets

(56) References Cited

U.S. PATENT DOCUMENTS

| | | | |
|---|---|---|---|
| 7,633,940 B1 | 12/2009 | Singh | |
| 7,990,847 B1 | 8/2011 | Leroy | |
| 8,504,719 B2 | 8/2013 | Swildens | |
| 8,565,117 B2 | 10/2013 | Hilt | |
| 8,972,602 B2 | 3/2015 | Mithyantha | |
| 9,178,805 B2 | 11/2015 | Goel | |
| 9,609,549 B2 | 3/2017 | Nguyen | |
| 9,923,798 B1 | 3/2018 | Bahadur | |
| 10,255,445 B1 * | 4/2019 | Brinskelle | G06F 21/606 |
| 10,567,288 B1 | 2/2020 | Mutnuru | |
| 10,728,149 B1 | 7/2020 | Ramanujan | |
| 11,075,986 B2 | 7/2021 | Kabbani | |
| 11,777,745 B2 * | 10/2023 | Gao | H04L 9/3268 713/156 |
| 2003/0112808 A1 | 6/2003 | Solomon | |
| 2019/0012909 A1 | 1/2019 | Mintz | |
| 2020/0336498 A1 * | 10/2020 | Cheng | G06F 21/6218 |

* cited by examiner

SYSTEMS AND METHODS FOR NETWORK TRAFFIC ROUTING AND LOAD BALANCING IN AN ELECTRONIC NETWORK

TECHNOLOGICAL FIELD

Example embodiments of the present disclosure relate to network traffic routing and load balancing in an electronic network.

BACKGROUND

Electronic networks and their associated components, such as servers, are burdened by a high level of traffic every day, every hour, every second of the day. Such traffic is only exacerbated when a server supports a website that is often visited by users. Thus, there exists a need for an automatic, dynamic, accurate efficient, and secure method and system to direct network traffic based on dynamic determinations of load balances and dynamic determinations of whether a website is operating or not, in real time.

Applicant has identified a number of deficiencies and problems associated with network traffic routing and load balancing. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for network traffic routing and load balancing in an electronic network.

In one aspect, a system for network traffic routing and load balancing in an electronic network, the system may comprise: a memory device with computer-readable program code stored thereon; at least one processing device, wherein executing the computer-readable code is configured to cause the at least one processing device to perform the following operations: identify, by an application layer, at least one website access request by a user account, wherein a website access request of the at least one website access request comprises a website identifier; transmit the website access request to a traffic routing layer; identify, by the traffic routing layer, a plurality of potential websites associated with the website access request; determine, by the traffic routing layer, whether a routing identifier is present for the user account and in response to determining the routing identifier for the user account, pin the user account to a pinned website of the potential websites based on the routing identifier; and determine, by the traffic routing layer, whether the pinned website comprises an up attribute or down attribute, wherein, in an instance where the pinned website comprises an up attribute, direct the website access request to the pinned website associated with the website identifier, or wherein, in an instance where the pinned web site comprises a down attribute, direct the web site access request to a secondary website associated with the website identifier.

In some embodiments, the system may further comprise: access, by the application layer and based on the website access request, a traffic control algorithm for the website access request; and transmit the website access request to a specific website traffic layer based on the traffic control algorithm. In some embodiments, the traffic control algorithm comprises at least one of a ratio algorithm, or a round robin algorithm.

In some embodiments, the secondary website comprises an up attribute.

In some embodiments, and in the instance where the pinned website comprises a down attribute, the system may further comprise: identify, by a specific website application routing layer, the secondary website to the pinned website, wherein the secondary website comprises an up attribute, wherein the secondary website comprises a similarity of at least one of a ratio of network traffic, a geographical location, or an entity identifier; and direct the website access request to the secondary website. In some embodiments, the identification of the secondary website may further comprise: identifying a predefined routing criteria, wherein the predefined routing criteria comprises at least one of a predefined order of potential websites, a round robin algorithm, a user interface criteria, or a ratio algorithm; and identifying, based on the predefined routing criteria, the secondary web site from the plurality of potential web sites.

In some embodiments, the system may further comprise: identify, by the specific web site application routing layer, a specific load of the secondary website, wherein the specific load of the secondary website comprises a load of the website access request; identify a load balance preference for the secondary website; determine whether to direct the website access request to the secondary website based on a comparison of the specific load balance of the secondary website and the load balance preference for the secondary website, wherein, in response to the specific load balance of the secondary website meeting or being less than the load balance preference of the secondary website, transmit the website access request to the secondary website, or wherein, in response to the specific load balance of the secondary website exceeding the load balance preference of the secondary website, transmit the website access request to a tertiary website.

In some embodiments, the system may further comprise: update, in the instance where the pinned website comprises a down attribute, the routing identifier with an identifier of the secondary website; store, in a routing identifier token, the updated routing identifier and a session identifier for the website access request; and store the updated routing identifier in a web browser associated with the user account.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompany- ing drawings. The components illustrated in the figures may or may not be present in certain embodiments described herein. Some embodiments may include fewer (or more) components than those shown in the figures.

Figure 1A:
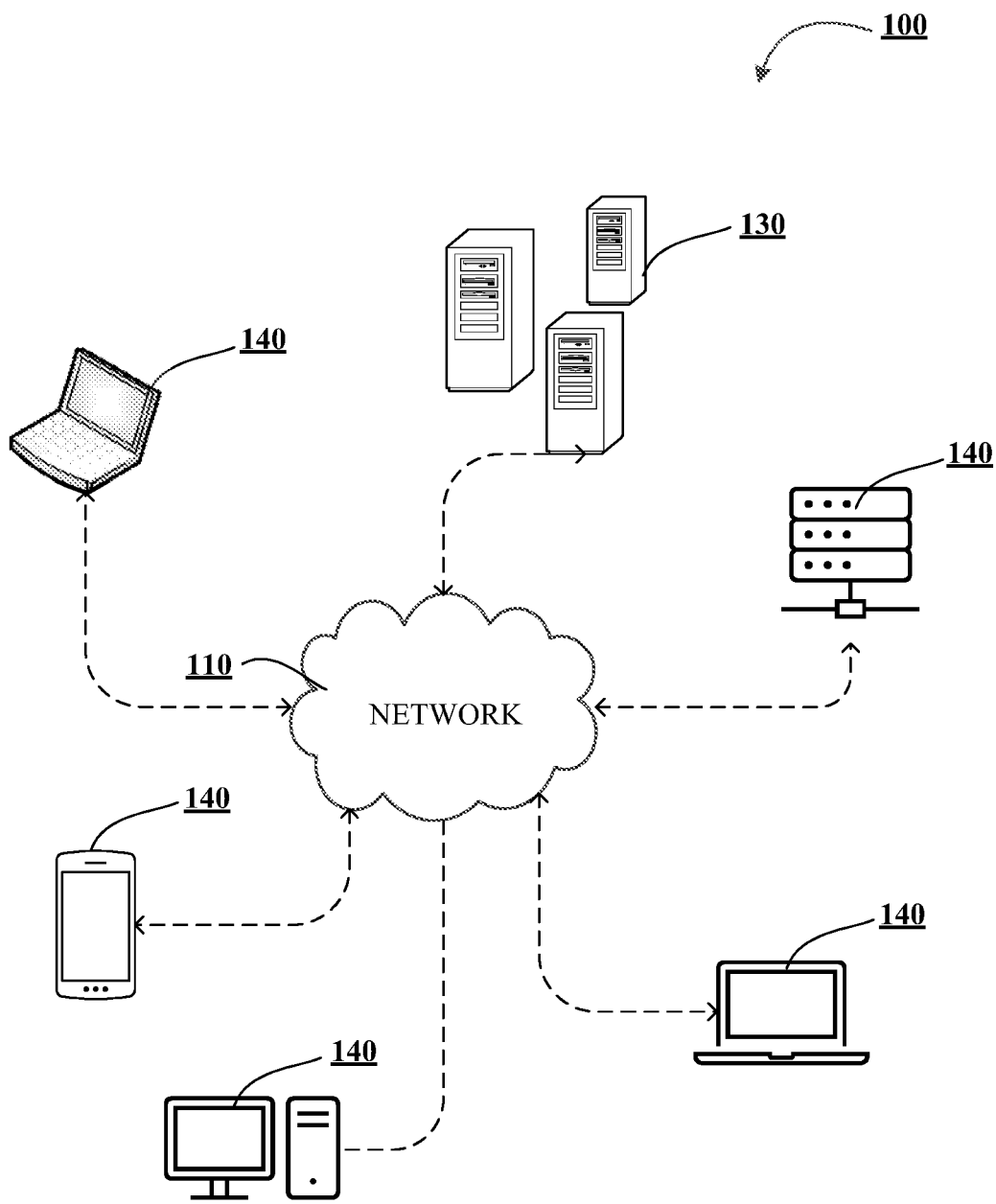
Figure 1B:
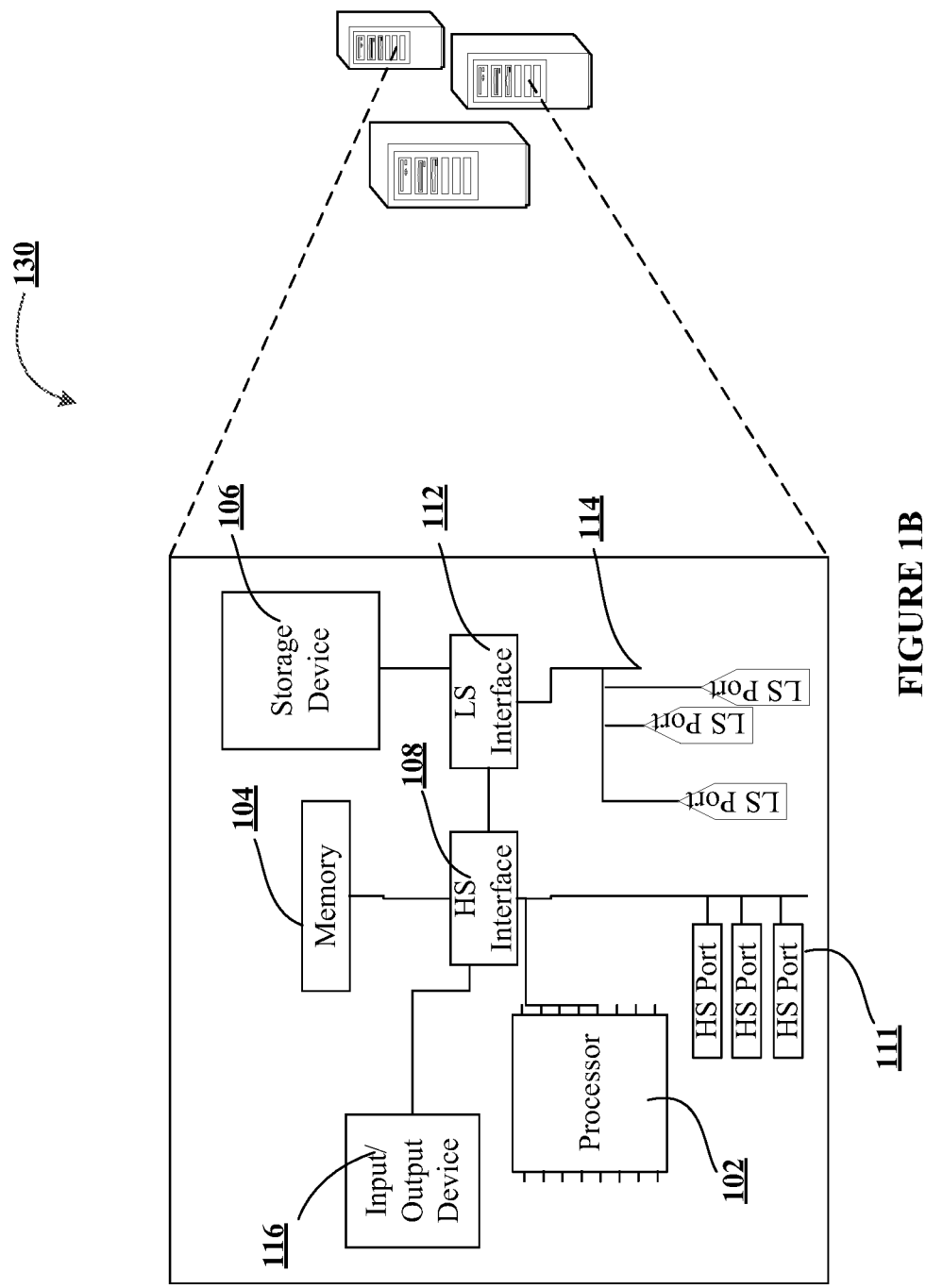
Figure 1C:
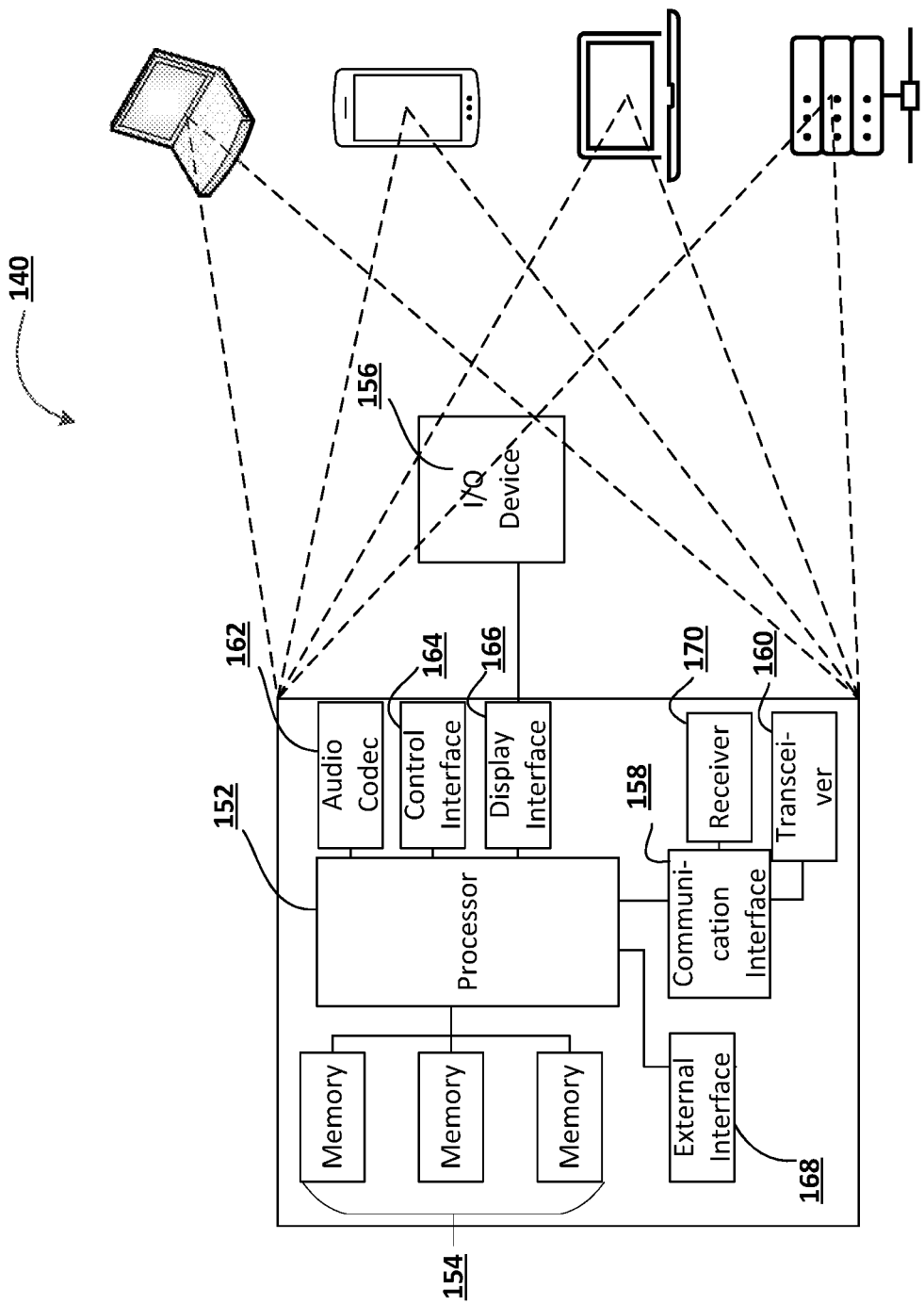
Figure 2:
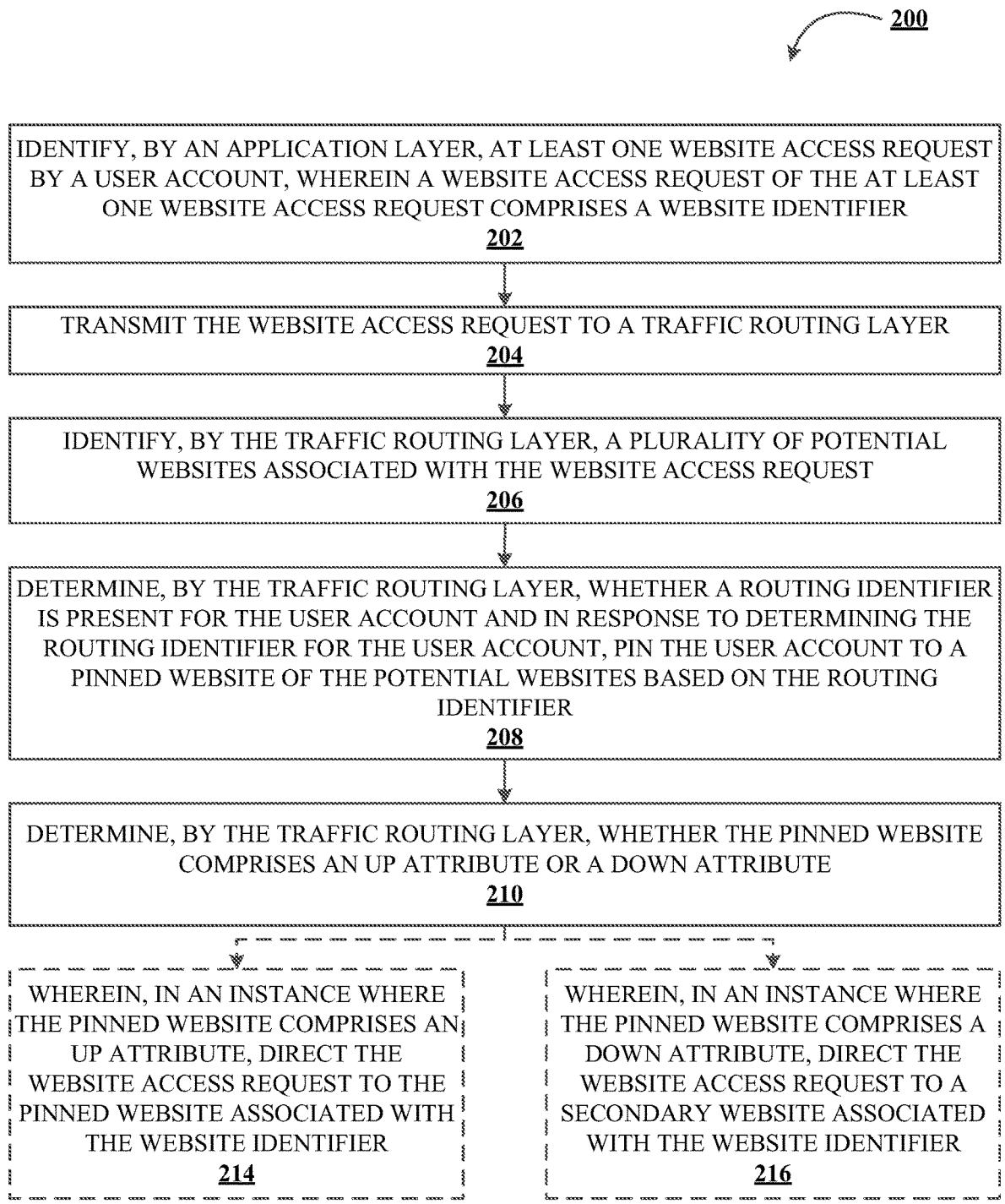
Figure 3:
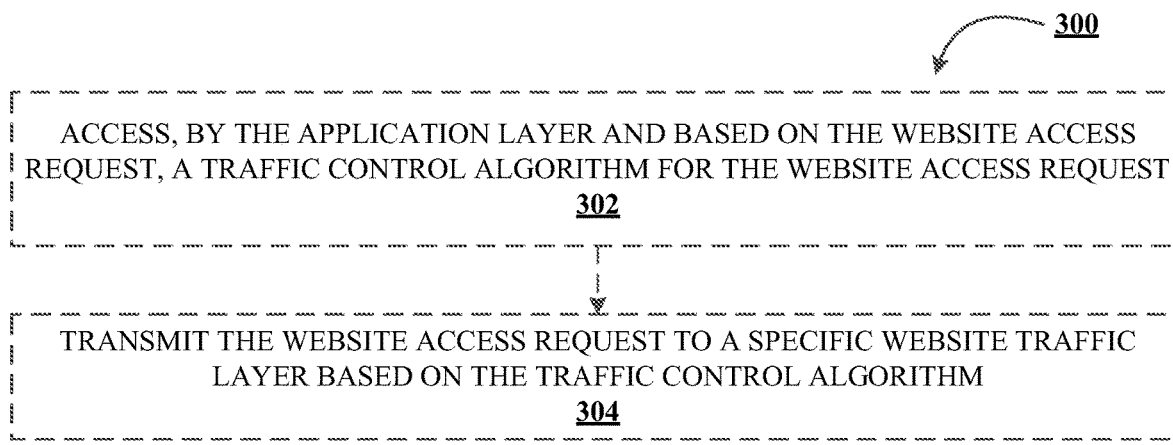
Figure 4:
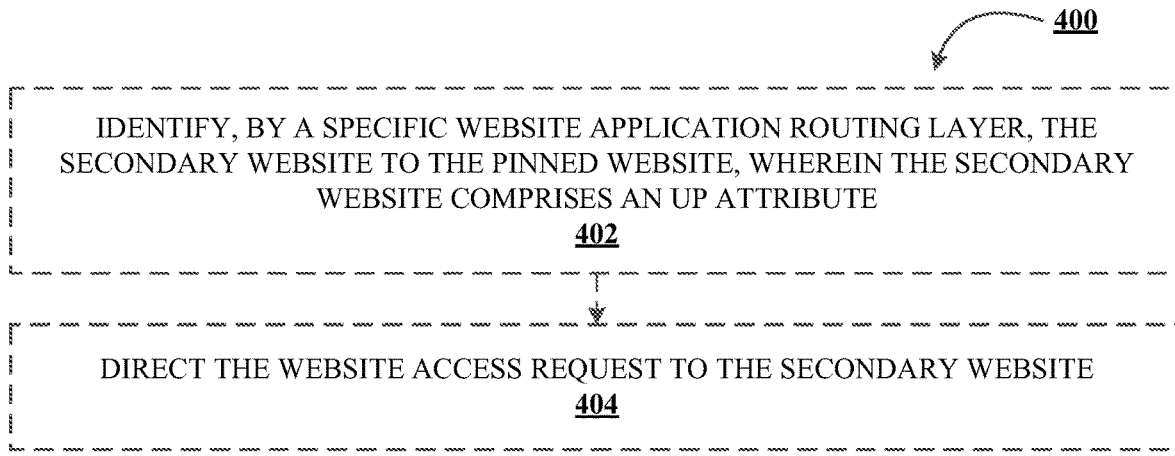
Figure 5:
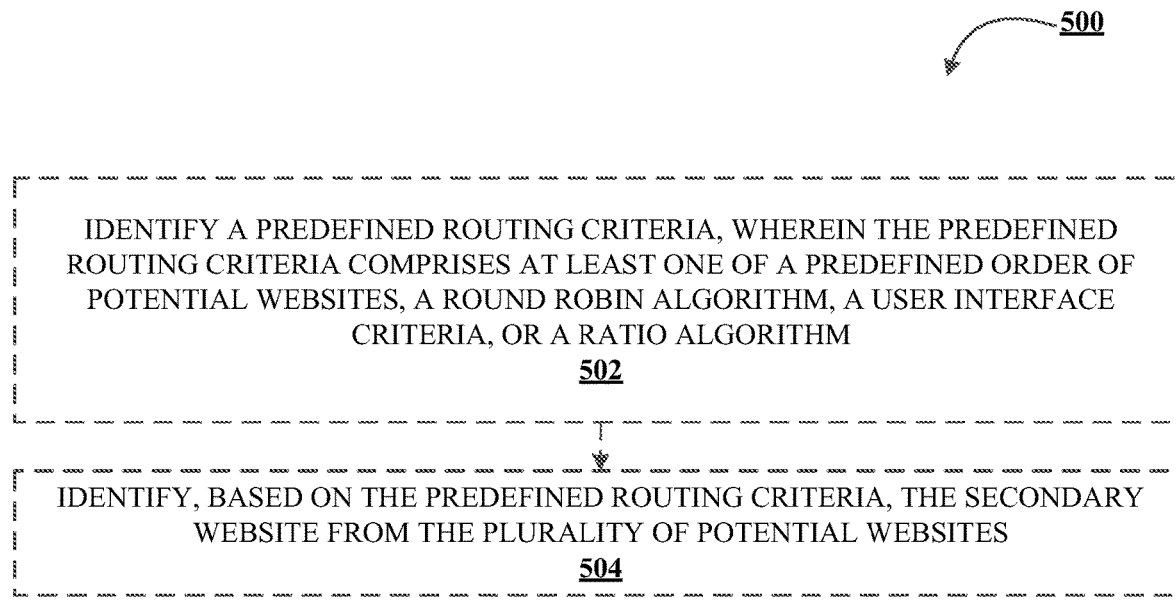
Figure 6:
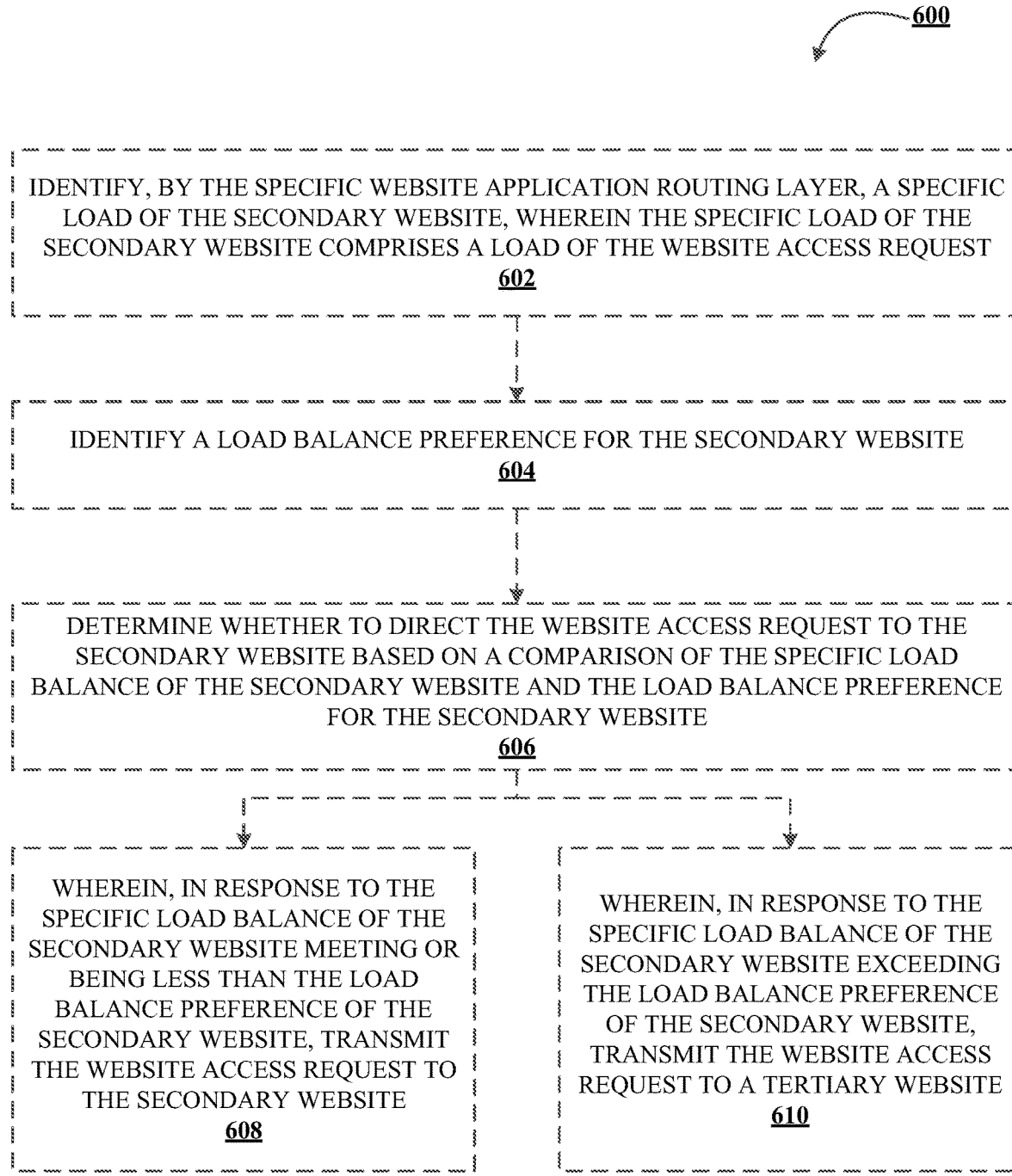
Figure 7:
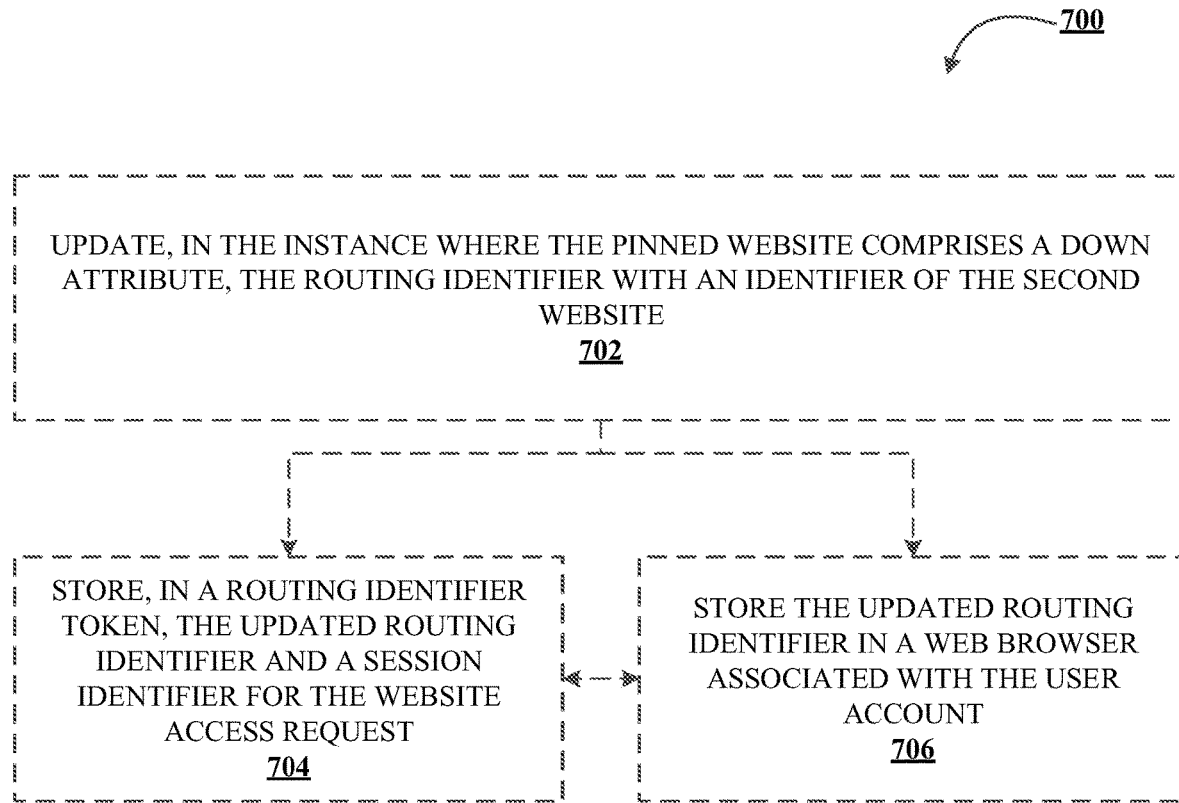
Figure 8:
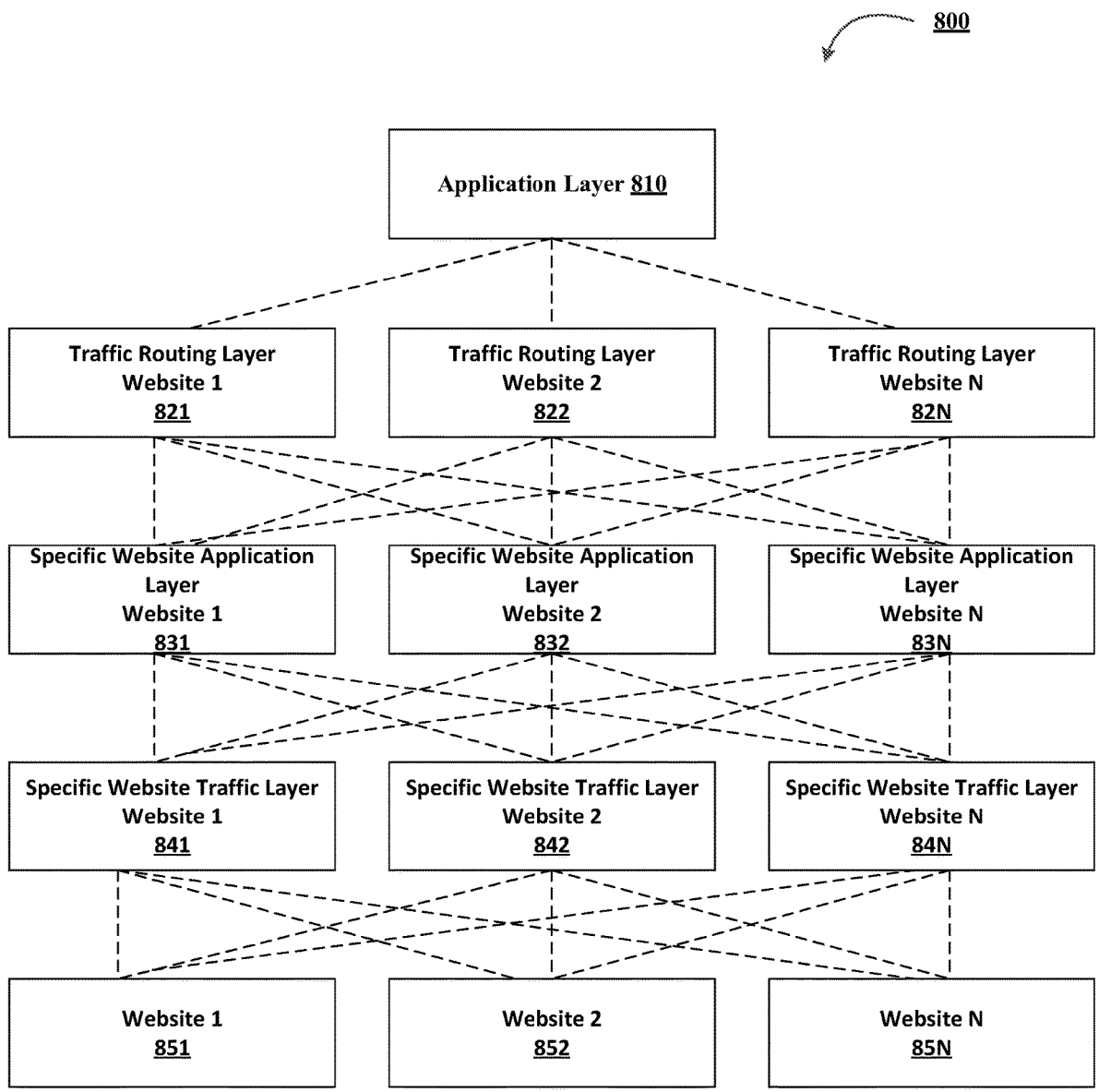

FIGS. 1A-1C illustrates technical components of an exemplary distributed computing environment for network traffic routing and load balancing in an electronic network, in accordance with an embodiment of the disclosure;

FIG. 2 illustrates a process flow for network traffic routing and load balancing in an electronic network, in accordance with an embodiment of the disclosure;

FIG. 3 illustrates a process flow for transmitting the website access request to a primary website routing layer, in accordance with an embodiment of the disclosure;

FIG. 4 illustrates a process flow for directing the user account to a secondary website, in accordance with an embodiment of the disclosure;

FIG. 5 illustrates a process flow for identifying the secondary website from the plurality of potential websites, in accordance with an embodiment of the disclosure;

FIG. 6 illustrates a process flow for determining whether to direct the website access request to the secondary website based on load balances, in accordance with an embodiment of the disclosure;

FIG. 7 illustrates a process flow for storing an updated routing identifier, in accordance with an embodiment of the disclosure; and FIG. 8 illustrates an exemplary block diagram for network traffic routing and load balancing in an electronic network, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Electronic networks and their associated components, such as servers, are burdened by a high level of traffic every day, every hour, every second of the day. Such traffic is only exacerbated when a server supports a website that is often visited by users. Thus, there exists a need for an automatic, dynamic, accurate efficient, and secure method and system to direct network traffic based on dynamic determinations of load balances and dynamic determinations of whether a website is operating or not, in real time.

Accordingly, the present disclosure provides for identifying, by an application layer (e.g., a generic Domain Name Specific (DNS) layer) at least one web site access request by a user account, wherein a website access request of the at least one website access request comprises a website identifier (e.g., a http address, a universal resource locator (URL), and/or the like); transmitting the web site access request to a traffic routing layer; identify, by the traffic routing layer, a plurality of potential web sites associated with the website access request (e.g., the same website hosted on different servers); determining, by the traffic routing layer, whether a routing identifier (e.g., identifying a version of the web site hosted on a particular server, where the user may have visited this version before) is present for the user account and in response to determining the routing identifier for the user account, and pinning the user account to a pinned website of the potential websites based on the routing identifier. The system may further provide for determining, by the traffic routing layer, whether the pinned website comprises an up attribute or down attribute (e.g., indicating whether the pinned website is up and running or down and not working), wherein, in an instance where the pinned website comprises an up attribute, direct the website access request to the pinned website associated with the website identifier, or wherein, in an instance where the pinned website comprises a down attribute, direct the website access request to a secondary website associated with the website identifier (e.g., whereby the secondary website comprises at least an up attribute).

What is more, the present disclosure provides a technical solution to a technical problem. As described herein, the technical problem includes traffic routing and load balancing for a website across different servers, without undue delay and undue burden on a server(s). The technical solution presented herein allows for a system, whereby the system provides for a dynamic and intelligent solution in website traffic routing and load balancing across different website servers in an accurate, efficient, and dynamic way through the use of multiple application and traffic routing layers. In particular, the system is an improvement over existing solutions to the website traffic routing and load balancing (i) with fewer steps to achieve the solution, thus reducing the amount of computing resources, such as processing resources, storage resources, network resources, and/or the like, that are being used, (ii) providing a more accurate solution to problem (e.g., through the use of multiple layers which may provide more resilient and redundant solutions, which in turn allow for lower likelihoods in error in determining which servers to transmit the website access requests), thus reducing the number of resources required to remedy any errors made due to a less accurate solution, (iii) removing manual input and waste from the implementation of the solution (e.g., by sending and receiving real time performance metrics from the web sites and servers themselves), thus improving speed and efficiency of the process and conserving computing resources, (iv) determining an optimal amount of resources that need to be used to implement the solution (by optimizing the number of layers implemented and each of their functions/configurations), thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for network traffic routing and load balancing in an electronic network 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connected to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for network traffic routing and load balancing in an electronic network, in accordance with an embodiment of the disclosure. In some embodiments, a system (e.g., similar to one or more of the systems described herein with respect to FIGS. 1A-1C) may perform one or more of the steps of process flow 200. For example, a system (e.g., the system 130 described herein with respect to FIG. 1A-1C) may perform the steps of process 200.

As shown in block 202, the process flow 200 may include the step of identifying— by an application layer—at least one website access request by a user account, wherein a website access request of the at least one website access request comprises a website identifier. The application layer, as described herein, refers to a generic Domain Name System (DNS) layer or application-layer protocol, whereby the application layer may receive a website identifier (such as a website address, HTTP address, and/or the like) within a website access request and may route the website access request to a specific version of the website hosted on a particular server.

In some embodiments, and as described herein, the application layer may be the top-most layer in an internet protocol (IP) model, whereby the IP model is used to determine which server should receive data (e.g., the website access request and other such data, such as authentication credentials, and/or the like). As used herein, such a server may host internet resources or applications, such as websites that are hosted on a plurality of servers. In some embodiments, the application layer may be configured to determine load balances across the websites (i.e., different versions of the same website hosted on different servers) in real time, and determine which websites to transit the website access request to. In some embodiments, the application layer may further be configured to determine a ratio, a round robin algorithm, and/or the like for traffic control, whereby such a determination may be used by the application layer for traffic control and determining at what point a server hosting a website should no longer receive website access traffic and at which point a different server should receive the website access traffic. Such embodiments are disclosed in further detail below. In some embodiments, the application layer may be configured to a topology algorithm for traffic control.

Thus, and as described herein, the system may identify a particular website hosted on a particular server to transmit each website access request to, wherein each website of the website identifier (e.g., each website hosted on the plurality of servers for the website identifier) is hosted on multiple servers to prevent overloading or overburdening a single server, such that website traffic may be controlled dynamically and in real time.

As used herein, the website access request refers to the input of a request to access a website or application, such as inputting a website address (http address, universal resource locator (URL), and/or the like) with website identifier (http address, specific webpage within the website, and/or the like). Such a website access request may be input on a web browser using a user account's user device, whereby the user of the user account may input—via a keyboard, mouse, and other such plug-in device—to generate the website access request and input the website access request in a search bar of a web browser.

In some embodiments, the user account as used herein (e.g., of a website access request) may be identified by the system by a user of the user account inputting authentication credentials either before and/or after inputting the website access request. In some embodiments, the user account may be identified by tracking a user device identifier (such as a media access control (MAC) address, and/or the like) which may itself be linked with a particular user account. In some embodiments, a user account may be associated and/or linked with a website identifier, such as a routing identifier for which website to transmit the user account—by the website access request—to (e.g., the user account may be associated and/or linked with a website identifier/routing identifier—a specific version hosted on a particular server for the website—for which the user account should always be transmitted to when attempting to access the website, and the system may use this information to determine the user identifier based on an already identified website identifier/routing identifier). For instance, the routing identifier may comprise a cookie that is stored on a web browser of the user's device, and such a cookie may then be used to transmit—upon receiving a website access request—the website access request to the website hosted on the particular server. In this manner, the system may use the cookie (the routing identifier) to determine the identity of the user account attempting access to the website based on which website the cookie transmits the website access request. Thus, and in some embodiments, only certain user accounts may be associated with a website hosted on a particular server, and the system may track each of these routing identifiers to determine which user account is which.

As shown in block 204, the process flow 200 may include the step of transmitting the website access request to a traffic routing layer. As used herein, the traffic routing layer refers to a load balancing layer that works at the application layer described with respect to block 202. For example, the traffic routing layer, as described herein, may be the highest layer in the open system interconnection (OSI) model, and may determine which website (e.g., website hosted on which server) to route the website access request to. For instance, and where the website is hosted on three different servers, the traffic routing layer may be configured to determine which of the three website versions to transmit the website access request to. Such a decision may be based on different criteria and/or based on predefined or predetermined routing decisions (such as which website is the pinned website, which is described in further detail below).

Additionally, and/or alternatively, the traffic routing layer may pin the website access request to a website hosted on a particular server based on a previously predefined pinned website which may be pre-linked or pre-associated with the user account of the website access request. Such a pinned website may be based on a geographic location of the user for the user account (e.g., the closest server that hosts the website may be the pinned website), based on an entity identifier of the user account (e.g., the user may be associated with a particular entity, such as a business, and that entity may only use a website hosted on a particular server), based on historical website access requests by the user account (e.g., the user account and its associated website access requests may always be directed to a website hosted on a particular server), and/or the like.

Further, and as described herein, the traffic routing layer may be configured to determine whether the pinned website (and in some embodiments, other such websites hosted on other servers besides the pinned website server) comprise an up attribute or down attribute. Such an up attribute may be dynamic and determined in real time, and used to determine whether the website is currently up and running. Such a down attribute may also be dynamic and determined in real time, and used to determine whether the website is currently down or not working. Based on such an up attribute or down attribute, the traffic routing layer may determine whether to transmit or direct the website access request to the pinned website (e.g., where the pinned website comprises an up attribute) or to a different website (e.g., where the pinned website comprises a down attribute).

As shown in block 206, the process flow 200 may include the step of identifying— by the traffic routing layer—a plurality of potential websites associated with the website access request. For example, the system—via the traffic routing layer—may identify a plurality of potential websites based on the website access request, and the associated website identifier, whereby the plurality of potential websites comprise the same user interfaces (UIs), such that the user experience is the same no matter which website the website access request is transmitted to. Such a plurality of potential websites may comprise a pinned website (e.g., the website that is predefined or predetermined that the website access request should go to), and other such secondary, tertiary, and/or the like websites that appear the same to a user when interacting with the websites but where each are hosted on different servers.

As shown in block 208, the process flow 200 may include the step of determining— by the traffic routing layer— whether a routing identifier is present for the user account and in response to determining the routing layer identifier for the user account, pin the user account to a pinned website of the potential websites based on the routing layer identifier. For instance, the routing identifier, as used herein, refers to a cookie and other such session tracking data packets when a user account is interacting with a website or application, and/or the like. In some embodiments, the routing identifier may be used by the traffic routing layer for transmitting the web access request to a particular website hosted at a particular server.

For instance, the routing identifier may be associated with the pinned website for the user account of the website access request. In this manner, the system may use the routing identifier to identify the pinned website, and to determine where to route the user account/website access request in a first instance (e.g., the pinned website), when the pinned website comprises an up attribute. However, and in the instance where the pinned website comprises a down attribute, the system may use the routing identifier to identify a secondary and/or tertiary website that the website access request should be sent to instead.

As shown in block 210, the process flow 200 may include the step of determining— by the traffic routing layer— whether the pinned website comprises an up attribute or a down attribute. For example, and as described hereinabove, the up attribute indicates whether a website is live, up and running, working, and/or the like. In some embodiments, the up attribute may comprise an indication that the website can handle the traffic being routed to it (e.g., will not be overloaded with website traffic by receiving the website access request and/or the like).

Additionally, and as described hereinabove, the down attribute indicates whether a website off, not working, and/or the like. In some embodiments, and similar to the up attribute, the down attribute may additionally and/or alternatively indicate whether the website cannot handle the website traffic being routed to it (e.g., including but not limited to the current website access request).

In some embodiments, the system may determine the up attribute and/or the down attribute by performing dynamic performance metrics in real time on each website, whereby the traffic routing layer and other such layer(s) (e.g., specific website application layer, specific web site traffic layer, and/or the like) can determine this on an up/down direction (for each web site 1, website 2, and/or the like and for each level). Such an embodiment is described in further detail below with respect to FIG. 8's block diagram of network traffic routing and load balancing in an electronic network.

In some embodiments, and as shown in block 214, the process flow 200 may include the step of directing—in an instance where the pinned website comprises an up attribute— the website access request to the pinned website associated with the website identifier. For example, the system may direct and/or transmit the website access request to the pinned website when the pinned website is determined to be up, working, and can handle the traffic of the website access request based on the performance metrics of the pinned website in real time (e.g., whether the pinned website is loading quickly, whether the pinned has graphics and/or images that are in line with previous instances of accessing the pinned web site, and/or the like).

In some embodiments, and as shown in block 216, the process flow 200 may include the step of directing—in an instance where the pinned website comprises a down attribute—the website access request to a secondary website associated with the website identifier. For example, the system may direct the website access request to a secondary website in the instance where the pinned web site comprises a down attribute and/or the pinned web site cannot handle the website access request's website traffic.

Thus, and where the secondary website comprises an up attribute and the secondary website can handle the website access request website traffic, the system may transmit or direct the website access request to the secondary website. Further, and in this embodiment, the direction of the website access request to the secondary website (and/or other such websites) means that the user interface for the user of the web site access request is seamless and appears the same as the pinned website (e.g., the time to load the secondary website (and other such websites) would be the same or very similar, the UI would be the same or very similar, and/or the like). In some embodiments, the redirection of the website access request to the secondary website may comprise a redirection of previously input or previously received authentication credentials at a first web site (e.g., the pinned website) to the secondary website (and/or the like) such that the UI is seamless, and the user account is still verified and signed in for the session despite being redirected to a different version of the website on another server. Such an embodiment is described in further detail below with respect to FIG. 7.

Thus, and in some embodiments, the system may determine which of the potential websites to be the secondary website to transmit the website access request. Such a determination may be based on at least one of a traffic control algorithm, such as that described in further detail below with respect to FIG. 3.

FIG. 3 illustrates a process flow for transmitting the website access request to a primary website routing layer, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300.

In some embodiments, and as shown in block 302, the process flow 300 may include the step of accessing—by the application layer and based on the website access request— a traffic control algorithm for the website access request. For example, the system may access a traffic control algorithm that may have been previously pre-determined by a client of the system, by a manager of the system, and/or by the system itself (e.g., based on previous traffic control algorithms used by the system that have worked well). Such a traffic control algorithm as that used herein may refer to a ratio algorithm or ratio selection of website traffic between websites hosted on different servers; a round robin algorithm to determine which website should be a secondary website, a tertiary website, and/or the like; a prioritization of websites, such as a prioritization or ranking of the websites to be the secondary website, the tertiary website, and/or the like; and/or the like. In some embodiments, the traffic control algorithm may also be re-determined at a website specific application layer, whereby the specific website application layer (e.g., the third layer, or "Specific Web site Application Layer Site" layer like that shown in FIG. 8) may redetermine—dynamically and in real time—whether to transmit or direct the website access request to the pinned website, the secondary website, and/or another such website based on the website traffic algorithm and/or based on an updated website traffic algorithm (e.g., where a website comprises a down attribute that was not previously accounted for in the original website traffic algorithm and/or where the original website traffic algorithm will no longer work).

In some embodiments, and as shown in block 304, the process flow 300 may include the step of transmitting the website access request to a specific website traffic layer based on the traffic control algorithm. As used herein, the specific website traffic layer refers to a secondary application routing layer that is configured to manage routing or directing the website access request based on the website traffic data of the specific website(s) (e.g., the pinned website, the secondary website, the tertiary website, and/or the like). Further, and based on the routing identifier, the website traffic of the website associated with the routing identifier (e.g., the pinned website and/or another such website depending on whether the pinned website comprises a down attribute and/or cannot handle the website access request), the specific website traffic layer may identify a different website to transmit the website access request to (e.g., the secondary website, and/or the like). Additionally, the specific website traffic layer may be configured to track backend server performance metrics to determine server performance (e.g., whether the website of each server would perform as well as the pinned website in loading, UI, and/or the like). Such a server performance metric(s) may be used by the specific website traffic layer to make a final determination of which website to transmit the website access request to.

Thus, and as described herein, the specific website traffic layer may be configured to determine website routing for the website access request based on the website traffic data—in real time—and based on the routing identifier. In some embodiments, the specific website traffic layer may be configured to direct the website access request based on application side preferences or criteria, such as but not limited to preferences of the client of the system, preferences of the manager of the system, and/or the like, whereby such preferences may comprise a ranking and/or determination of other websites to transmit the website access request when the pinned website cannot take it.

FIG. 4 illustrates a process flow for directing the user account to a secondary website, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process flow 400.

In some embodiments, and as shown in block 402, the process flow 400 may include the step of identifying—by a specific website application routing layer—the secondary website to the pinned website, wherein the secondary website comprises an up attribute. For example, the system may identify a secondary website to the pinned website, whereby the secondary website is the backup or secondary website that should receive the website access request when the pinned website cannot receive the website access request.

For instance, and where the pinned website comprises a down attribute, the system may instead—via the layers described herein—determine a secondary website to transmit or direct the website access request to instead of the pinned website (and/or to redirect the website access request from the pinned website if the pinned website was already accessed during the current session). In some embodiments, the secondary website may be determined from the potential websites based on a traffic control algorithm, such as but not limited to a preference, a ranking, a round robin algorithm, and/or the like. Further, and in order to transmit the web site access request to the secondary website, the secondary website should comprise an up attribute indicating that the secondary website is currently up and running. Further, the system should also determine that the secondary website is able to handle the traffic of the website access request and/or other such website access requests identified/received at the same time (e.g., without undue burden or slowing down the loading or UI for the user).

In some embodiments, and as shown in block 404, the process flow 400 may include the step of directing the website access request to the secondary website. For example, the system may direct and/or transmit the website access request to the secondary website—where the secondary website is up and running and can handle the traffic of at least the website access request. In some embodiments, the system may further determine and direct the website access request only to the secondary website when (1) the secondary website comprises an up attribute, (2) the secondary website can handle the website traffic of the website access request (and other such expected website access requests), and (3) the secondary website meets the performance metric thresholds required by the system (such that the redirection or direction to the secondary website is seamless as compared to the pinned website).

However, and in the instance where the secondary website cannot handle the traffic of the website access request and/or where the secondary website is down (comprises a down attribute), the system may be configured to refer "up" or "down" to the layer(s) (e.g., where the system is currently at the specific web site application layer (e.g., as shown in FIG. 8), the system may move up to the traffic routing layer (as shown in FIG. 8) to determine which other website to transmit or direct the website access request to (e.g., specific website application layer website 2, specific website application layer website 3, . . . specific website application layer website N).

FIG. 5 illustrates a process flow for identifying the secondary website from the plurality of potential websites, in accordance with an embodiment of the disclosure. In some embodiments, a system (e.g., similar to one or more of the systems described herein with respect to FIGS. 1A-1C) may perform one or more of the steps of process flow 500. For example, a system (e.g., the system 130 described herein with respect to FIG. 1A-1C) may perform the steps of process flow 500.

In some embodiments, and as shown in block 502, the process flow 500 may include the step of identifying a predefined routing criteria, wherein the predefined comprises at least one of a predefined order of potential web sites, a round robin algorithm, a user interface criteria, or a ratio algorithm. For example, the system may identify a predefined routing criteria, such as but not limited to the level of the interaction and experience offered by the website(s) and whether the web site(s) are the same as the pinned web site (such that the web sites appear the exact same via the UI); the speed of loading the website(s) (such that the website load appears seamless with the pinned website and is loaded in the same speed or in the same time as the pinned website); the graphics or images of the web site(s) (such that the graphics and/or images are the same as the pinned website); the geolocation of the server for the website(s) (e.g., being closest to the pinned website's server); a preference or ranking of the website(s) (including the pinned website being primary, a secondary website, a tertiary website, and/or the like), and/or the like.

In some embodiments, the predefined routing criteria may be predefined or predetermined by the system itself, by a manager of the system, by a client of the system, and/or the like.

In some embodiments, and as shown in block 504, the process flow 500 may include the step of identifying-based on the predefined routing criteria—the secondary website from the plurality of potential websites. For example, the system may identify the secondary website from the plurality of potential websites (e.g., of the same website in the website access request, but hosted on different servers) based on the whether the secondary website identified meets the predefined routing criteria. Such a predefined routing criteria may require all the criteria options to be met or only some of the potential options to be met (e.g., the level of the interaction and experience offered by the web site(s) and whether the web site(s) are the same as the pinned web site; the speed of loading the web site(s); the graphics or images of the web site(s); and/or the geolocation of the server for the website(s)). In some embodiments, the predefined routing criteria that must be met may be identified by a manager of the system, by a client of the system, by the system itself, and/or the like.

Based on the identified secondary website meeting least the predefined routing criteria, the system may transmit or direct the website access request to the secondary website. In some embodiments, and where there are multiple websites that meet the criteria and meet it at the same level, a predefined ranking may be used by the system to determine which website should be secondary, which should be tertiary, and/or the like. Such a predefined ranking may be predefined by a manager of the system, by a client of the system, by the system itself, and/or the like.

FIG. 6 illustrates a process flow for determining whether to direct the website access request to the secondary website based on load balances, in accordance with an embodiment of the disclosure. In some embodiments, a system (e.g., similar to one or more of the systems described herein with respect to FIGS. 1A-1C) may perform one or more of the steps of process flow 600. For example, a system (e.g., the system 130 described herein with respect to FIG. 1A-1C) may perform the steps of process 600.

In some embodiments, and as shown in block 602, the process flow 600 may include the step of identifying—by the specific website application routing layer—a specific load of the secondary website, wherein the specific load of the secondary website comprises a load of the website access request. For instance, the system may identify a specific load of the secondary website, whereby the specific load is associated with the current and/or predicted future load of website traffic on the secondary website (and/or other such websites). For instance, and based on the website access request, the specific load of the secondary website may comprise the current website traffic load and the load of the website access request(s) (e.g., all the website access request(s) that are determined to be directed to the secondary website at an immediate future or a likely almost-immediate future). In some embodiments, the website access requests that may be directed to the secondary website may be based on those website access requests that were supposed to be directed to a first or pinned website different than the secondary website, but now that the first or pinned website is down or cannot handle the web traffic, the system has determined to send the website access request(s) to the secondary website. Further, and in some embodiments, the specific load of the secondary website may be based on those website access requests associated with user accounts where the secondary website is the user accounts' pinned website (e.g., such as those where the website access request is submitted in a geolocation close to the server of the secondary website, so the secondary website acts as the pinned website for those user accounts, when geolocation is used as a predefined routing criteria).

In some embodiments, the specific website traffic layer may additionally and/or alternatively identify the specific load of the secondary website in the same and/or similar manner as described above. In this manner, the system may comprise this extra layer of determination and confirmation that the secondary website can handle the website traffic at a last instance before transmitting the website access request. For instance, and as shown in FIG. 8, the specific website traffic layer may be configured as the last layer in the traffic routing protocol (e.g., of application layer, traffic routing layer, specific web site application layer, and specific web site traffic layer) before being directed or transmitted to the actual receiving website (e.g., the pinned website, the secondary website, the tertiary website, and/or the like). Such a specific website traffic layer allows for more accurate determination of traffic routing for each website in order to overload any server hosting each version of the website.

In some embodiments, and as shown in block 604, the process flow 600 may include the step of identifying a load balance preference for the secondary website. For instance, the system may identify a load balance preference based on an expected load balance of the server for what a website can handle without the presence of issues or undue delays. For example, and when a server is overloaded with website traffic, the server may not be able to handle any incoming requests or future requests, the load time for web site may be delayed, the load time for specific webpages within the website may be delayed, and/or the like. Such a load balance preference may be pre-set and/or pre-determined, and/or determined in real-time based on running diagnostics on the server and/or the website as it loads. As used herein, the load balance preference refers to a threshold of the load balance on the server before a problem or issue is likely to occur. In this manner, the load balance preference may act as a threshold to allow and/or block a website access request if the website access request's website traffic were to cause the load balance (i.e., the specific load balance as referred to below) to exceed the load balance preference.

In some embodiments, and as shown in block 606, the process flow 600 may include the step of determining whether to direct the web site access request to the secondary website based on a comparison of the specific load balance of the secondary website and the load balance preference for the secondary website. Thus, and in some embodiments, the system may determine whether to direct the website access request to the secondary website based on a comparison of the specific load balance (e.g., with the website access request(s)), and the load balance preference for the website (e.g., the secondary website, the pinned website if we were sending it to the pinned website to begin with, the tertiary website if we were sending the website access request there instead, and/or the like). As used herein, the load balance preference refers to a threshold for the website traffic/load balance, and whereby the specific load balance is less then, meets, or exceeds the load balance preference, the website access request may be directed to the secondary website or to another website (e.g., a tertiary website, and/or the like).

As understood by a person of skill in the art, each of the websites that are determined to potentially receive the website access request may comprise their own specific load balance, which may then be compared against the associated load balance preference in order to determine whether the website can or should receive the website access request. The use of the term "secondary website" is meant to be exemplary here and not intended as limiting in the number of potential websites that may receive the website access request.

In some embodiments, and as shown in block 608, the process flow 600 may include the step of transmitting—in response to the specific load balance of the secondary website meeting or being less than the load balance preference of the secondary website—the website access request to the secondary website. For instance, the system may transmit and/or direct the website access request to the secondary website where the secondary website can handle the load of the website access request and other such potential website access requests that my come in.

In some embodiments, and as shown in block 610, the process flow 600 may include the step of transmitting—in response to the specific load balance of the secondary website exceeding the load balance preference of the secondary website—the website access request to a tertiary website. For instance, the system may transmit and/or direct the website access request to a different website when the secondary website cannot handle the load of the website access request and other such potential website access requests that my come in. Such a different website may be a tertiary website that has undergone the same process(es) as that described herein with determining whether the tertiary website is up, whether the tertiary website can handle the load of the website access request, and/or whether the tertiary website meets the predefined criteria.

As understood by those skill in the art, the use of the term "tertiary website" is not meant to be limiting as to the number of potential websites that may be considered for receiving the website access request. Rather, and as intended herein, the number of potential websites may be unlimited in number (such as where the website is hosted across many different servers across the world).

FIG. 7 illustrates a process flow for storing an updated routing identifier, in accordance with an embodiment of the disclosure. In some embodiments, a system (e.g., similar to one or more of the systems described herein with respect to FIGS. 1A-1C) may perform one or more of the steps of process flow 700. For example, a system (e.g., the system 130 described herein with respect to FIG. 1A-1C) may perform the steps of process 700.

In some embodiments, and as shown in block 702, the process flow 700 may include the step of updating—in an instance where the pinned website comprises a down attribute—the routing identifier with an attribute of the secondary website. For example, the system may update the routing identifier (e.g., cookie) with an attribute of the secondary website, such that the system can identify which website (e.g., a website hosted on which server) to transmit or direct the website access request to at a current or future time. Thus, and as used herein, upon updating the routing identifier with the secondary website identifier, the system may then require the user account to be transmitted to the secondary website from that point forward whenever the system identifies the website access request with the same website identifier. In this manner, the secondary website may then be saved as the new pinned website for the user account.

In some embodiments, the routing identifier may be a cookie that comprises all of the authentication credentials previously input on the pinned website (e.g., within the current session of the pinned website), such that when an/or if the website access request is redirected to a secondary website, the authentication credentials may be automatically input and the user interface will not change from a logged in user interface (e.g., authentication credentials will not need to be input twice between different servers). As understood by a person of skill in the art, the use of a cookie to store the authentication credentials of a session is not limited to a session that started at a pinned website and ended at a secondary website, but may be started at any of the potential websites of the website identifier and redirected to any of the other potential websites within the same active session. Such a scenario may comprise the use of replicating the session and the associated authentication credentials within the cookie and/or within a token (described in further detail below with respect to a routing identifier token), such that the UI does not change even with a redirection to a different server.

In some embodiments, the routing identifier may itself comprise a data packet of information such as the identifier of the pinned website that should receive the website access request initially (e.g., until it is determined the pinned website cannot receive the website access request).

In some embodiments, and as shown in block 704, the process flow 700 may include the step of storing—in a routing identifier token—the updated routing identifier and a session identifier for the website access request. For example, the system may store the updated routing identifier (e.g., with the chosen website and server to receive the web site access request)— and, in some embodiments, the authentication credentials—in a routing identifier token which may be used to store the session data for later authentication and continuation of the session. Such a routing identifier token may be stored on the user device and/or within the user device's web browser. Thus, such a routing identifier token may be used to transmit the session data of the website access request between websites hosted on the different servers. In this manner, and similar to the cookie of the routing identifier, the system may generate and/or update the routing identifier token with the authentication credentials already input at a session on another website hosted on a different server and may transmit the routing identifier token to a secondary, tertiary, and/or other website for automatic authentication and allowance to the session on the secondary, tertiary, and/or other web site.

In some embodiments, and as shown in block 706, the process flow 700 may include the step of storing the updated routing identifier in a web browser associated with the user account. Additionally, and/or alternatively to the embodiments described herein, the system may store the updated routing identifier in a web browser, such that web browser itself stores the cookie with the authentication credentials and the data of the current session when directing the website access request to a secondary, tertiary, and/or other website.

FIG. 8 illustrates an exemplary block diagram for network traffic routing and load balancing in an electronic network, in accordance with an embodiment of the disclosure. In some embodiments, a system (e.g., similar to one or more of the systems described herein with respect to FIGS. 1A-1C) may perform one or more of the steps in performing the steps of the block diagram. For example, a system (e.g., the system 130 described herein with respect to FIG. 1A-1C) may perform the steps to perform block diagram 800.

Similar to the processes and embodiments described herein, the exemplary block diagram 800 comprises an application layer 810, a second layer (e.g., a generic DNS layer) such as that comprising the Traffic Routing Layer Website 1 821, the Traffic Routing Layer Website 2 822, and the Traffic Routing Layer Website N 82N; a third layer (e.g., a traffic routing layer) such as that comprising the Specific Website Application Layer Website 1 831, the Specific Website Application Layer Website 2 832, and the Specific Website Application Layer Website N 83N; a fourth layer (e.g., a second DNS layer, or website specific DNS layer) such as that comprising the Specific Website Traffic Layer Web site 1 841, the Specific Website Traffic Layer Website 2 842, and the Specific Website Traffic Layer Website N 84N; and the actual receiving websites of the website access request(s) such as that comprising Website 1 851, Website 2 852, and Web site N 85N.

In this manner, and as shown in exemplary diagram 800, a website access request may be received at the first layer (the DNS layer), or the application layer 810, which may be configured to determine the load balancing of website traffic across the different servers hosting the website (e.g., website 1 851, website 2 852, . . . website N 85N) by analyzing the data of each of the layers within the block diagram 800. Further, the first layer, the application layer 810 may be configured to determine which web site is the pinned web site for the user account (which may be determined by a cookie or routing identifier associated with the user account/associated with the web browser of the user account) and may determine using the data of the second layer (the traffic routing layer) whether the pinned website comprises an up or down attribute.

In some embodiments, the application layer may additionally be configured to determine the proper traffic control algorithm (e.g., the predetermined or predefined traffic control algorithm that should be used if the pinned website cannot be used).

Additionally, and the second layer (the traffic routing layer for each website hosted on the different servers) may be configured to actually pin the user account to a pinned website (e.g., based on routing identifier previously identified), such that the website access request may automatically be directed to the pinned website if the pinned website comprises an up attribute. However, and in the embodiment where the pinned website comprises a down attribute, the traffic routing layer may redirect the web site access request to a different (or secondary website) that comprises an up attribute, such as a different website that meets the predefined routing criteria (e.g., the website that is the fastest to load of the potential websites).

The system may further use the third layer (or the specific website application layer) as the second DNS layer to provide a resilient and redundant solution to website traffic routing and load balancing, such that the second DNS layer acts as a second layer of protection for monitoring which servers and websites can receive the website access request(s) without overburdening themselves. In some embodiments, the specific website application layer may be configured to load balance the website traffic across the websites comprising up attributes in a specific order (such as an order preference), such that the websites and servers are not overburdened by receiving too many web site access requests at the same time.

Additionally, the system may provide a fourth layer (the specific website traffic layer) to manage the routing identifier (e.g., cookie) and route traffic based on the routing identifier. In some embodiments, and like that described herein, the system may update the routing identifier with a different website identifier such as a secondary website identifier when a pinned website comprises a down attribute and/or cannot handle the website traffic of the website access request. Further, the specific website traffic layer may be configured to traffic the website access requests based on the predefined routing criteria and whether the receiving website(s) meet the required predefined routing criteria at a current time. Additionally, the specific website traffic layer may be configured to track the performance metrics of each of the websites (and their servers) to determine whether the web sites can handle each of the web site access requests they are likely to receive. Such a performance metric measurement made in real-time and at the layer directly above the website layer allows the system to dynamically, intelligently, and in real time determine which website should receive which website access requests.

Lastly, and with respect to the website layer, the website layer (e.g., Website 1 851, Website 2 852, Website N 85N) are each configured to transmit real time performance metrics back to the previous (above) layers, including but not limited to the specific website traffic layer.

As shown herein, each of the arrows between each of the layers described herein with respect to block diagram 800 may each be in communication with the blocks directly above and/or below (e.g., as the straight arrows indicate between Website 1's layers, website 2's layer, and website N's layers), or the websites blocks within other layers above and/or below (e.g., indicated as the diagonal arrows (e.g., between traffic routing layer website 1 821 and specific website application layer website N 83N). Thus, and as understood by a person of skill in the art, each of the blocks and their associated configurations within the layers may be in communication with the entire block diagram and not only with the blocks directly above or directly below itself and/or the blocks only concerned with the associated web site (e.g., website 1 doesn't not have to only communication with website 1 blocks).

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for network traffic routing and load balancing in an electronic network, the system comprising:
   a memory device with computer-readable program code stored thereon;
   at least one processing device, wherein executing the computer-readable code is configured to cause the at least one processing device to perform the following operations:
   identify, by an application layer, at least one website access request by a user account, wherein a website access request of the at least one website access request comprises a website identifier;
   transmit the website access request to a traffic routing layer;
   identify, by the traffic routing layer, a plurality of potential websites associated with the website access request;
   determine, by the traffic routing layer, whether a routing identifier is present for the user account and in response to determining the routing identifier for the user account, pin the user account to a pinned website of the potential websites based on the routing identifier; and
   determine, by the traffic routing layer, whether the pinned website comprises an up attribute or down attribute,
      wherein, in an instance where the pinned website comprises an up attribute, direct the website access request to the pinned website associated with the website identifier, or
      wherein, in an instance where the pinned website comprises a down attribute, direct the website access request to a secondary website associated with the website identifier.

2. The system of claim 1, wherein the system further comprises:
   access, by the application layer and based on the website access request, a traffic control algorithm for the website access request; and
   transmit the website access request to a specific website traffic layer based on the traffic control algorithm.

3. The system of claim 2, wherein the traffic control algorithm comprises at least one of a ratio algorithm, or a round robin algorithm.

4. The system of claim 1, wherein the secondary website comprises an up attribute.

5. The system of claim 1, in the instance where the pinned website comprises a down attribute, the system may further comprise:
   identify, by a specific website application routing layer, the secondary website to the pinned website, wherein the secondary website comprises an up attribute, wherein the secondary website comprises a similarity of at least one of a ratio of network traffic, a geographical location, or an entity identifier; and
   direct the website access request to the secondary website.

6. The system of claim 5, wherein the identification of the secondary website comprises:
   identifying a predefined routing criteria, wherein the predefined routing criteria comprises at least one of a predefined order of potential websites, a round robin algorithm, a user interface criteria, or a ratio algorithm; and
   identifying, based on the predefined routing criteria, the secondary website from the plurality of potential websites.

7. The system of claim 5, the system further comprising:
   identify, by the specific website application routing layer, a specific load of the secondary website, wherein the specific load of the secondary website comprises a load of the website access request;
   identify a load balance preference for the secondary website;
   determine whether to direct the website access request to the secondary website based on a comparison of the specific load balance of the secondary website and the load balance preference for the secondary website,
      wherein, in response to the specific load balance of the secondary website meeting or being less than the load balance preference of the secondary website, transmit the website access request to the secondary website, or
      wherein, in response to the specific load balance of the secondary website exceeding the load balance preference of the secondary website, transmit the website access request to a tertiary website.

8. The system of claim 1, the system further comprising:
   update, in the instance where the pinned website comprises a down attribute, the routing identifier with an identifier of the secondary website;
   store, in a routing identifier token, the updated routing identifier and a session identifier for the website access request; and
   store the updated routing identifier in a web browser associated with the user account.

9. A computer program product for network traffic routing and load balancing in an electronic network, wherein the computer program product comprises at least one non-transitory computer-readable medium having computer-readable program code portions embodied therein, the computer-readable program code portions which when executed by a processing device are configured to cause the processor to perform the following operations:
   identify, by an application layer, at least one website access request by a user account, wherein one website access request of the at least one access request comprises a website identifier;
   transmit the at least one website access request to a traffic routing layer;
   identify, by the traffic routing layer, a plurality of potential websites associated with the at least one web site access request;
   determine, by the traffic routing layer, whether a routing identifier is present for the user account and in response to determining the routing identifier for the user account, pin the user account to a pinned website of the potential websites based on the routing identifier; and
   determine, by the traffic routing layer, whether the pinned website comprises an up attribute or down attribute, wherein, in an instance where the pinned website comprises an up attribute, direct the one website access request to the pinned website associated with the website identifier, or wherein, in an instance where the pinned website comprises a down attribute, direct the one website access request to a secondary website associated with the website identifier.

10. The computer program product of claim 9, wherein the processing device is configured to cause the processor to perform the following operations:

access, by the application layer and based on the at least one website access request, a traffic control algorithm for the at least one website access request; and transmit the at least one website access request to a specific website traffic layer based on the traffic control algorithm.

11. The computer program product of claim 10, wherein the traffic control algorithm comprises at least one of a ratio algorithm, or a round-robin algorithm.

12. The computer program product of claim 9, wherein the secondary website comprises an up attribute.

13. The computer program product of claim 9, in the instance where the pinned website comprises a down attribute, the computer program product further comprising:

identify, by a specific website application routing layer, a secondary website to the pinned website, wherein the secondary website comprises an up attribute, wherein the secondary website comprises a similarity of at least one of a ratio of network traffic, a geographical location, or an entity identifier; and direct the user account to the secondary website.

14. The computer program product of claim 13, wherein the processing device is configured to cause the processor to perform the following operations:

identify, by the traffic routing layer, the secondary website, wherein the identification of the secondary website comprises:

identifying a predefined routing criteria, wherein the predefined routing criteria comprises at least one of a predefined order of potential websites, a round robin algorithm, a user interface criteria, or a ratio algorithm; and determining, based on the predefined routing criteria, the secondary website from the plurality of potential websites.

15. A computer implemented method for network traffic routing and load balancing in an electronic network, the computer implemented method comprising:

identifying, by an application layer, at least one website access request by a user account, wherein one website access request of the at least one access request comprises a website identifier;

transmitting the at least one website access request to a traffic routing layer;

identifying, by the traffic routing layer, a plurality of potential websites associated with the at least one web site access request;

determining, by the traffic routing layer, whether a routing identifier is present for the user account and in response to determining the routing identifier for the user account, pin the user account to a pinned website of the potential websites based on the routing identifier; and determining, by the traffic routing layer, whether the pinned website comprises an up attribute or down attribute, wherein, in an instance where the pinned website comprises an up attribute, directing the one website access request to the pinned website associated with the website identifier, or wherein, in an instance where the pinned website comprises a down attribute, directing the one website access request to a secondary website associated with the website identifier.

16. The computer implemented method of claim 15, the computer implemented method comprising:

accessing, by the application layer and based on the at least one website access request, a traffic control algorithm for the at least one website access request; and transmitting the at least one website access request to a specific website traffic layer based on the traffic control algorithm.

17. The computer implemented method of claim 16, wherein the traffic control algorithm comprises at least one of a ratio algorithm, or a round-robin algorithm.

18. The computer implemented method of claim 15, wherein the secondary web site comprises an up attribute.

19. The computer implemented method of claim 15, the computer implemented method comprising:

identifying, by a specific website application routing layer, a secondary website to the pinned website, wherein the secondary website comprises an up attribute, wherein the secondary website comprises a similarity of at least one of a ratio of network traffic, a geographical location, or an entity identifier; and directing the user account to the secondary website.

20. The computer implemented method of claim 19, the computer implemented method comprising:

identifying, by the traffic routing layer, the secondary website, wherein the identification of the secondary website comprises:

identifying a predefined routing criteria, wherein the predefined routing criteria comprises at least one of a predefined order of potential websites, a round robin algorithm, a user interface criteria, or a ratio algorithm; and determining, based on the predefined routing criteria, the secondary website from the plurality of potential websites.

* * * * *